United States Patent [19]

Tanaka

[11] 3,916,425

[45] Oct. 28, 1975

[54] DIAPHRAGM APPARATUS EQUIPPED WITH AUTOMATIC FLASH EXPOSURE SYSTEM FOR CAMERA

[75] Inventor: Harumi Tanaka, Kobe, Japan

[73] Assignee: Minolta Camera Kabushiki Kaisha, Osaka, Japan

[22] Filed: Sept. 7, 1973

[21] Appl. No.: 395,099

[30] Foreign Application Priority Data
Sept. 16, 1972 Japan................................ 47-93477

[52] U.S. Cl.................................... 354/196; 354/44
[51] Int. Cl.²...................... G03B 9/02; G03B 3/00
[58] Field of Search............ 95/64 A, 64 R; 354/44, 354/43, 196, 29

[56] References Cited
UNITED STATES PATENTS

| | | | |
|---|---|---|---|
| 3,583,299 | 6/1971 | Land................................ | 95/64 A X |
| 3,714,871 | 2/1973 | Bresson........................... | 95/64 A X |
| 3,750,543 | 8/1973 | Eloranta et al. ................. | 95/64 A X |

*Primary Examiner*—Joseph F. Peters, Jr.
*Assistant Examiner*—O'Connor, E. M.
*Attorney, Agent, or Firm*—Wolder & Gross

[57] ABSTRACT

An apparatus comprising an electromagnet for the diaphragm to be energized or unenergized under the control of an exposure amount control electric circuit depending on whether the brightness of subject is high or low, a distance associated member shiftable in operative relation to a distance adjusting member when a flash unit is mounted on the camera, and diaphragm setting and operating means operable in accordance with the energization and unenergization of the electromagnet to set the diaphragm aperture at two stages corresponding to the energization and unenergization respectively, the diaphragm setting and operating means being operable to detect the position of the distance associated member and to thereby determine the diaphragm aperture size in a continuous manner in accordance with the subject distance when the flash unit is mounted.

7 Claims, 3 Drawing Figures

“DIAPHRAGM APPARATUS EQUIPPED WITH AUTOMATIC FLASH EXPOSURE SYSTEM FOR CAMERA”

BACKGROUND OF THE INVENTION

This invention relates to a diaphragm apparatus equipped with an automatic flash exposure system for use in photographic cameras, more particularly to a diaphragm apparatus in which the diaphragm aperture size is altered stepwisely in accordance with the brightness of the subject for ordinary photographic operations, the automatic flash exposure system being operable for flash photography.

Conventional diaphragm apparatus in which the diaphragm aperture can be set in a multi-stepwise manner are complex in construction and involve difficulties in correcting and adjusting the diaphragm aperture settings. Further with diaphragm apparatuses equipped with an automatic flash exposure system, the flash exposure system likewise has a complex construction and it is therefore difficult to adapt such apparatus for use in ultraminiature cameras employing for example 16 mm flm.

SUMMARY OF THE INVENTION

An object of this invention is to provide a diaphragm apparatus for ultraminiature cameras in which an electromagnet included in a diaphragm control electric circuit is energized or unenergized depending on the brightness of subject so as to determine the diaphragm aperture sizes for bright subjects and for subjects of low brightness in accordance with energization and unenergization of the electromagnet and in which the diaphragm aperture size is determined for flash photography in corresponding relation to the adjusted subject distance in operative relation to a distance adjusting member so as to simplify the diaphragm apparatus having an automatic flash exposure system.

Another object of this invention is to improve the reliability of operation of the foregoing apparatus in which the diaphragm aperture size is determined by a distance adjusting procedure when the flash unit is mounted on the camera.

According to this invention, the diaphragm apparatus comprises an electromagnet to be energized or left unenergized in accordance with the brightness the subject, a distance associated member rendered operable along with a distance adjusting member by a flash unit when it is mounted on the camera, and diaphragm setting and operating means operable in accordance with the energization and unenergization of the electromagnet to set the diaphragm aperture at two stages, the diaphragm setting and operating means further being operable upon detecting the position of the distance associated member when the flash unit is mounted so as to determine the diaphragm aperture size steplessly that is, in a continuous or stepless manner in exact accordance with the amount of movement of the associated member.

Thus the diaphragm setting and operating means functions in operative relation to the electromagnet for ordinary photographic operations and to the distance adjusting procedure for flash photography. This simplifies the diaphragm apparatus in its construction and, at the same time, makes it possible to incorporate an automatic flash exposure system into the diaphragm apparatus with an extremely simple construction in which only several members are additionally used. The apparatus is therefore suitable for use in ultraminiature cameras equipped, for instance, with a diaphragm comprising two reciprocally slidable blades.

The diaphragm apparatus provides the diaphragm aperture at one of two stages depending on the brightness of subject for usual photographing operations, while the diaphragm aperture size for flash photography is determined by the apparatus steplessly in accordance with the distance to the subject. Consequently, the apparatus assures accurate operation with improved reliability.

Other objects and features of this invention will become more apparent from the following description of embodiments of the invention.

DESCRIPTION OF THE PREFERRED EMBODIMENTS

The illustrated embodiments are diaphragm mechanisms equipped with an automatic flash exposure system for use in cameras incorporating an electronic shutter. The drawings show the apparatus and the principal part of an electronic shutter mechanism in operative relation thereto.

Figure 1:
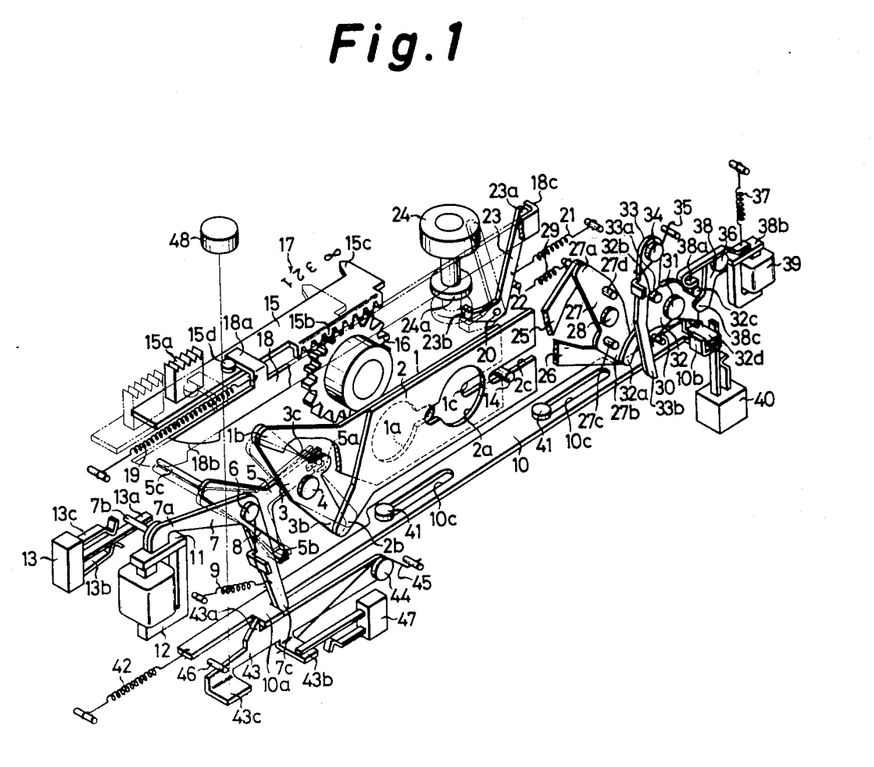
FIG. 1 is a perspective view showing the principal part of an embodiment of this invention as the shutter has been completely cocked.
Figure 2:
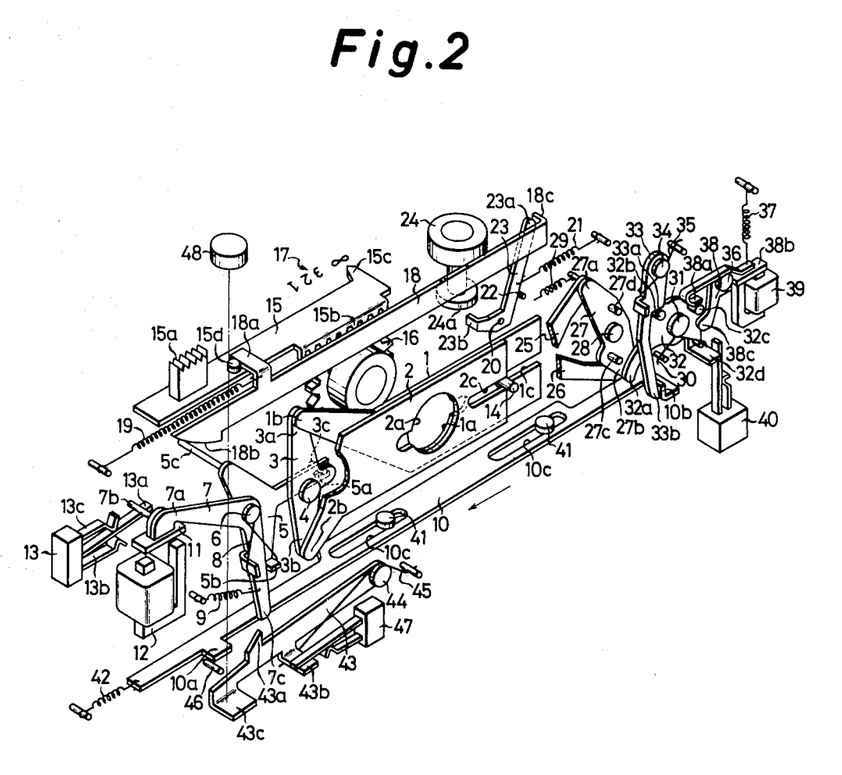
FIG. 2 is a perspective view showing the same when the diaphragm has been opened to its maximum aperture by a shutter tripping action.

With reference to FIGS. 1 and 2, a pair of diaphragm sectors 1 and 2 having openings 1a and 2a are supported on an unillustrated base plate and are slidable in opposite directions to each other. The arms 1b and 2b are pivotally connected to the upper end 3a and lower end 3b of a diaphragm sector opening and closing member 3 respectively.

The sector opening and closing member 3 is pivoted at its center portion to a pin 4 on the base plate and is provided on its projection with a pin 3c in engagement with a slot 5a at the distal end of a forked portion of a first diaphragm actuating member 5. The pivotal movement of the actuating member 5 pivotally moves the member 3 in the same directions as the member 5, causing the diaphragm sectors 1 and 2 to move slidingly to thereby open and close the diaphragm.

The first diaphragm operating member 5 is pivoted to a pin 6, which further pivotally carries a second diaphragm actuating member 7. Under the action of a spring 8, the first diaphragm actuating member 5 has its lower bent end 5b held in elastic contact with the second diaphragm actuating member 7. Both the members 5 and 7 are connected together by the spring 8 so as to be pivotally movable together.

The second diaphragm actuating member 7 is spring-loaded as at 9 in a clockwise direction. While the shutter is in its cocked position, the member 7 has its lower end 7c pushed in a counterclockwise direction by the arm 10a of a shutter release actuating member 10. Pivoted by a pin 7b to the distal end of arm 7a of the diaphragm actuating member 7 is an attraction piece 11 which is in pressing contact with, or is positioned close to, the attracting face of a diaphragm electromagnet 12. When energized, the electromagnet 12 retains the actuating member 7 in its attracted position in spite of the leftward travel of the shutter release actuating member 10, whereas while the electromagnet 12 is unenergized, the diaphragm actuating member 7 turns clockwise under the action of the spring 9 to follow the shutter release actuating member 10 when the member 10 travels leftward. While the shutter is in its cocked position, the pin 7b pushes the movable contact member 13a of a change-over switch 13 to close its stationary contact member 13b and leave its stationary contact member 13c open. The clockwise turning of the second diaphragm actuating member 7 effects a change-over action, freeing the movable contact member 13a from the pressure to open the stationary contact member 13b and close the stationary contact member 13c.

The change-over switch 13 is included in an unillustrated exposure amount control electric circuit as disclosed in U.S. Pat. No. 2,956,491 and also serves to give information of diaphragm aperture values to the exposure time control means of the circuit for subjects of high and low brightnesses. The circuit may be of the known type and the information of diaphragm aperture values may be transmitted in any desired manner.

The electromagnet 12 has its energizing winding included in the diaphragm control means of the exposure amount control electric circuit. For example, such a diaphragm control means is disclosed in U.S. Pat. No. 2,956,491, granted Oct. 18, 1960. If the subject has a high brightness, the magnet 12 will be energized simultaneously with closing of the main switch (to be described later) of the circuit to hold the attraction piece 11 attracted and to electrically retain the second diaphragm actuating member 7 at is cocked position. If the subject has a low brightness, current will not be supplied to the winding in spite of closing of the main switch, leaving the magnet 12 unenergized and permitting the second diaphragm actuating member 7 to turn in a clockwise direction under the action of the spring 9.

For ordinary photographic operations, the diaphragm operation afforded by the diaphragm sectors 1 and 2 is controlled by the energization and deenergization of the electromagnet 12 through the diaphragm sector opening and closing member 3, first diaphragm actuating member 5 and second diaphragm actuating member 7. In response to a bright subject, the electromagnet 12 is energized by a shutter tripping action to electrically retain the second diaphragm actuating member 7 in its cocked position, with the result that the diaphragm openings 1a and 2a are maintained in an overlapped state to give a diaphragm aperture value, for example, of f/8. If the subject has a low brightness, the electromagnet remains unenergized in spite of a shutter tripping action, causing the second diaphragm actuating member 7 to turn in a closkwise direction under the action of the spring 9 and to thereby follow the leftward travel of the shutter release actuating member 10. Through the spring 8, this movement further turns the first diaphragm actuating member 5 in the same direction and consequently turns the diaphragm sector opening and closing member 3 in a clockwise direction, slidingly moving the diaphragm sectors 1 and 2 in directions opposite to each other, whereby the diaphragm openings 1a and 2a are overlapped to the greatest extent to fully open the diaphragm aperture. In the illustrated embodiment, the diaphragm sectors 1 and 2 are formed with slots 1c and 2c in which a pin 14 on the base plate engages respectively. The pin 14 comes into contact with the bottom of the slot 2c at the position of minium diaphragm aperture and with the bottom of the slot 1c at the position of maximum diaphragm aperture, the pin 14 thus serving as a stop for the sliding movement of the diaphragm sectors 1 and 2. Instead of disposing the stop for direct action on the diaphragm sectors 1 and 2, the stop may alternatively be so provided as to act on one of the diaphragm sector opening and closing member 3, first and second diaphragm actuating members 5 and 7.

A distance adjusting member 15 having an operating portion 15a projecting from the outer surface of an unillustrated camera body or lens barrel is supported, in the illustrated embodiment, on the camera body and is slidable leftward and rightward. The member 15 has a rack portion 15b meshing with a gear 16 for moving the photographic lens (not shown). The operating portion 15a is pushed to slidingly move the member 15 leftward or rightward and to thereby rotate the gear 16, whereby the lens is displaced for focusing. The distance to the subject is indicated by an indicator 15c opposing a distance scale 17 engraved in the camera body or lens barrel.

The distance adjusting member 15 is provided with a pin 15d. A distance associated member 18 supported on the camera body and slidable leftward and rightward has an arm 18a which is adapted for contact with the pin 15d under the action of a spring 19 positioned at the left of the arm 18a.

The distance associated member 18 is movable in operative relation to the distance adjusting member 15 only for flash photography. The member 18 slides along in operative relation to the movement of the member 15 as indicated in the phantom line in FIG. 1 to position a cam portion 18b at its end in the path of movement of pin 5c on the first diaphragm actuating member 5 during the clockwise turning of the member 5 and to thereby control the amount of turning in corresponding relation to the subject distance. This control determines the diaphragm aperture steplessly in corresponding relation to the subject distance.

The member 18 has a bent rear end 18c in contact with the arm 23a of a latch lever 23 pivoted to the base plate by a pin 20 and urged by a spring 21 in a clockwise direction. The position of the lever 23 is determined by a stop 22. Since the spring 21 is stronger than the spring 19 biasing the distance associated member 18 leftward, the distance associated member 18 has been moved rightward against the spring 19 and retained at the position determined by the stop 22 during an ordinary photographic operation in which the diaphragm aperture is determined by energization and deenergization of the diaphragm electromagnet 12. The latch lever 23 has a bent arm 23b positioned under a member 24 for detecting a flash unit mounted in position. While the distance associated member 18 is latched in position as determined by the stop 22, the pin 5c of the first diaphragm actuating member 5 comes into contact with the cam portion 18b when the first diaphragm actuating member 5 turns in a clockwise direction by virtue of unenergization of the diaphragm electromagnet 12. Thus the member 18 serves as a stop for the actuating member 5 when the diaphragm is opened fully and acts to eliminate the inertia of the respective members involved in a rapid full-opening action.

Normally, the detecting member 24 is biased by an unillustrated spring or the like to an elevated position but is moved down to the phantom-line position in FIG. 1 by the unillustrated flash unit being mounted on the camera, causing a flange 24a at its lower end to depress the bent arm 23b of the latch lever 23, which is therefore turned in a counterclockwise direction to the illustrated phantom-line position against the action of the spring 21. Consequently, the distance associated member 18 is released from the latch lever 23, permitting the arm 18a to come into contact with the pin 15d on the distance adjusting member 15. Thus the member 18 is rendered movable leftward to follow the movement of the distance adjusting member 15 under the action of the spring 19 as illustrated in the phantom line.

When a flash photograph is to be taken, the brightness of the subject is so low that the electromagnet 12 will not be energized when the shutter is tripped. Accordingly, the distance adjusting member 15 is manipulated to determine the subject distance, whereby the position of the cam portion 18b of the distance associated member 18 is also determined. Upon the shutter being tripped, the cam portion 18b regulates the amount of turning of the first diaphragm actuating member 5 to give a diaphragm aperture in accordance with the subject distance. Thus in this case, the size of the diaphragm aperture is determined steplessly in accordance with the subject distance over the range from minium aperture to maximum aperture.

Inasmuch as the first diaphragm actuating member 5 is coupled to the second diaphragm actuating member 7 by the spring 8, the member 5 can turn in a counterclockwise direction as indicated in the phantom line in the drawing, even if the member 7 has its attraction piece 11 pressed against the attraction face of the electromagnet 12. As a result, the distance associated member 18 will be moved further leftward beyond the illustrated phantom-line position by a distance adjusting operation, causing the cam portion 18b to depress the pin 5c counterclockwise to its phantom line position and thereby making it possible to reduce the diaphragm aperture, for example, beyond f8 for an ordinary photographic operation. The construction therefore serves to assure flash photography at a very small subject distance.

The illustrated embodiment further includes a pair of shutter sectors 25 and 26 which are in the form of two reciprocally slidable blades as already known. (To simplify the drawings, only the arms of the sectors are shown in the drawings.) The shutter sectors are pivotally connected to the upper end 27a and lower end 27b of a shutter sector opening and closing member 27, which moves pivotally reciprocally to slidingly move the sectors reciprocally and to thereby open and close the shutter.

The shutter sector opening and closing member 27, pivoted to a pin 28, is urged in a counterclockwise direction by a spring 29. Normally, the position of the member 27 is determined by an unillustrated stop to keep the shutter closed.

Projecting from the member 27 are a shutter opening pin 27c and a shutter closing pin 27d at the opposite sides of the pin 28. A shutter driving member 32 is turnable in a clockwise direction about a pin 31 upon tripping the shutter under the action of a spring 30 that is stronger than the spring 29. The member 32 has an arm 32a which comes into contact with the pins 27c and 27d in succession by virtue of the clockwise turning so as to move the member 27 pivotally reciprocally.

When the shutter is in its cocked position, the shutter driving member 32 has its pin 32b engaged with a stepped portion 33a of a shutter opening initiating member 33, whereby the member 32 is retained in its cocked position.

The shutter opening initiating member 33, pivoted to a pin 34 and urged by a spring 35 in a counterclockwise direction, retains the shutter driving member 32 in its cocked position as already described and has a downwardly extending leg 33b whose lower end is positioned in the path of leftward advance of an upright lug 10b formed at the rear end of the shutter release actuating member 10.

A shutter closing initiating member 38 is pivoted to a pin 36 and urged by a spring 37 in a counterclockwise direction. The shutter driving member 32 has a pin 32c thereon which is in contact with the distal end of driven arm 38a of the member 38 to press the attraction portion 38b of the member 38 against, or to position the same close to, the attraction surface of a shutter electromagnet 39 against the spring 37. Further when in its cocked position, the driving member 32 causes its bent portion 32d to press the movable contact member of a count switch 40 to close the switch. The bent portion 32d is positioned on the right side of the upright lug 10b of the shutter release actuating member 10 so as to be engageable with the lug 10b when cocking the shutter.

The shutter closing initiating member 38 has a latch arm 38c which is located, when the shutter is in its cocked position, in the path of advance of the pin 32c on the shutter driving member 32 during the clockwise turning of the member 32. The electromagnet 39 for the shutter has its energizing winding included in the exposure time control means of the exposure amount control electric circuit and is energized simultaneously with the closing of a main switch (to be described later) to attract the attraction portion 38b of the closing initiating member 38 and to thereby retain the member 38 electrically. The relation between the arm 38c and the pin 32c is so determined that, while the member 38 is retained by the electromagnet 39, the latch arm 38c latches the pin 32c on the shutter driving member 32 which turns clockwise upon shutter tripping so as to cause the arm 32a of the driving member 32 to maintain the shutter in its open position.

The count switch 40 is opened simultaneously when the shutter driving member 32 starts to turn in a clockwise direction and energizes the CR integration circuit of the electric circuit to permit the same to measure the exposure time, upon completion of which the electromagnet 39 is deenergized as already known.

The shutter release actuating member 10 is supported on the base plate and is slidable leftward and rightward by virtue of engagement of a guide pin 41 in its slot 10c. The member 10 is urged leftward by a spring 42 and, while the shutter is in its cocked position, has its arm 10a engaged by the upward projection 43a of a shutter release member 43 and is thereby retained in position.

The shutter release member 43 pivoted by a pin 44 to the base plate is urged by a spring 45 in a clockwise direction into engagement with a stop 46. In this state, the movable contact member of main switch 47 of the exposure amount control circuit is held pushed up by the arm 43b of the member 43, whereby the switch 47 is kept open. The member 43 further has a bent portion 43c which causes an unillustrated shutter rod to urge a shutter button 48 upward to project the button 48 from the upper surface of the unillustrated camera body.

The apparatus operates in the manner to be described below with reference to FIGS. 1 and 2.

The shutter button 48 is depressed when the shutter is in its cocked position as seen in FIG. 1, whereupon the shutter release member 43 is turned in a counterclockwise direction to close the main switch 47 of the exposure amount control electric circuit and to energize the electromagnet 39 for the shutter, before the shutter release actuating member 10 is disengaged from the upward projection 43a.

If the subject at this time has a high brightness, namely if the brightness of the subject is higher than a specified level, the electromagnet 12 for the diaphragm will be energized simultaneously with the energization of the electromagnet 39, causing the second diaphragm actuating member 7 to be retained, by its attraction piece 11, in its cocked position electrically, with the result that the spring 8, first diaphragm actuating member 5 and diaphragm sector opening and closing member 3 act to maintain the diaphragm aperture at a reduced value, for example, of f8, as set for a bright subject.

Subsequently, the shutter release actuating member 10 will be freed from the engagement, whereupon the member 10 travels leftward under the action of the spring 42. At a position close to its extremity of stroke of travel, the upright lug 10b strikes against the leg 33b of the shutter opening initiating member 33 to turn the member 33 in a clockwise direction and to thereby free the shutter driving member 32 from the member 33.

Accordingly, the driving member 32 turns in a clockwise direction under the action of the spring 30 and opens the count switch 40 for the initiation of exposure time measuring. Furthermore the arm 32a of the driving member 32 comes into contact with the opening pin 27c on the shutter sector opening and closing member 27 and moves the pin 27c from out of the path of advance of the arm 32a against the action of the spring 29, turning the opening and closing member 27 in a clockwise direction, whereby the shutter sectors 25 and 26 are slidingly moved in directions opposite to each other to open the shutter.

On the other hand, the shutter closing initiating member 38 is retained in its cocked position electrically by the energized electromagnet 39, with its latch arm 38c positioned in the path of advance of the pin 32c on the shutter driving member 32, so that upon opening the shutter the driving member 32 is prevented from turning clockwise by the engagement of the pin 32c with the latch arm 38c. Consequently, the member 32 is stopped with the tip of its arm 32a in engagement with the opening pin 27c to keep the shutter open.

Inasmuch as the subject is bright and the integration circuit completes measuring within a very short period of time, the electromagnet 39 will be deenergized after a very short period of energization. This permits the spring 37 to turn the shutter closing initiating member 38 in a counterclockwise direction, retracting the latch arm 38c from the path of advance of the pin 32c. As a result, the shutter driving member 32 starts to turn in the clockwise direction again. Simultaneously with this, the arm 32a moves past the opening pin 27c, whereupon the shutter sector opening and closing member 27 starts to return in a counterclockwise direction under the action of the spring 29 to initiate a shutter closing action. Furthermore, after passing the position of the opening pin 27c, the arm 32a of the shutter driving member 32 strikes against the closing pin 27d on the opening and closing member 27 and promotes the return action. Thus the shutter closing action is effected rapidly to complete the photographic operation.

Since the shutter release actuating member 10 has completed its leftward travel, the shutter release member 43 returns clockwise under the action of the spring 45 when the shutter button 48 is relieved of the depressing force. The member 43 therefore pushes up the shutter button 48 and stops upon contact with the stopper 46.

During the shutter opening and closing action described above, the measuring time is so short for a high speed shutter operation that before the shutter opening action opens the shutter to a full extent, the shutter electromagnet 39 will be deenergized, with the result that the shutter driving member 32 will turn without being stopped at the position where the shutter is fully opened to immediately effect a shutter closing action.

Next if the subject has a low brightness, the depression of the shutter button 48 turns the shutter release member 43 in a counterclockwise direction to close the main switch 47, but the electromagnet 12 for the diaphragm will not be engergized although only the electromagnet 39 for the shutter is energized.

Accordingly, if the depression of the shutter button 48 and the closing of the main switch 47 is followed by leftward travel of the shutter release actuating member 10 freed from its cocked position while the flash unit is not mounted in place, the second diaphragm actuating member 7 turns in a clockwise direction under the action of the spring 9 to follow the leftward travel of the member 10 as seen in FIG. 2, bringing the movable contact member 13a of the change-over switch 13 into contact with the stationary contact member 13c to give the exposure amount control electric circuit information to open up the diaphragm. The movement of the member 7 is transmitted through the spring 8, first diaphragm actuating member 5 and diaphragm sector opening and closing member 3 to slidingly move the diaphragm sectors 1 and 2 in directions opposite to each other and to thereby open the diaphragm to the full aperture.

Inasmuch as the flash unit is not mounted in this case, the distance associated member 18 is retained in the most rightward position, without limiting the clockwise turning of the first diaphragm actuating member 5 until the diaphragm is fully opened. Thus the diaphragm sectors 1 and 2 can slide along until the bottom of the slot 1c contacts the pin 14.

The foregoing operation is completed instantaneously, followed by further leftward travel of the shutter release actuating member 10, whereby the shutter driving member 32 is unlatched as already described to initiate a shutter opening action. At the same time, the count switch 40 is opened to initiate measurement of the exposure time. In the meantime, the shutter driving member 32 is electrically retained at the position where the shutter is fully opened, by the electromagnet 39 through the shutter closing initiating member 38. Consequently, the shutter is held open. Upon lapse of the exposure time involving the information of the diaphragm value, the electromagnet 39 is deenergized to free the shutter driving member 32 from the retention into clockwise turning, permitting a shutter closing action as already described to complete the photographic operation. When the shutter button 48 is relieved of the depressing force, the shutter release member 43 returns to the original position.

If the unillustrated flash unit is mounted on the camera in FIG. 1, the detecting member 24 moves down to the illustrated phantom-line position, turning the latch lever 23 in a counterclockwise direction against the spring 21. The distance associated member 18 which has been retained by the latch lever 23 at the right-end position therefore travels leftward under the action of the spring 19 and brings its arm 18a into contact with the pin 15d on the distance adjusting member 15. This renders the member 18 operable with the member 15.

Accordingly, the adjustment of the subject distance determines the position of the cam portion 18b of the distance associated member 18 and, in corresponding relation to this, the diaphragm aperture value is determined for flash photography as will be described later.

For instance, if the distance adjusting member 15 is so positioned that the subject distance is infinite, the cam portion 18b of the distance associated member 18 is at such position that it permits the first diaphragm actuating member to turn clockwise to move the diaphragm sectors 1 and 2 to the position where the diaphragm will be fully opened. As the subject distance reduces, the cam portion 18b will be shifted in the direction to limit the clockwise turning of the first diaphragm actuating member 5 to a decreasing amount.

Since the electromagnet 12 for the diaphragm is unenergized in this case, the depression of the shutter button 48 frees the shutter release actuating member 10 into leftward travel, permitting the first and second diaphragm actuating members 5 and 7 and the diaphragm sector opening and closing member 3 to turn in a clockwise direction until the pin 5c on the first diaphragm actuating member 5 comes into contact with the cam portion 18c. The diaphragm sectors 1 and 2 therefore slide along in directions opposite to each other to give a diaphragm aperture value corresponding to the subject distance. Thus the diaphragm aperture can be set steplessly in accordance with the subject distance, unlike ordinary photographic operation using no flash unit in which the diaphragm aperture is set at two stages, i.e., at full-open value and f8.

With electronic shutters, the shutter speed is set at a specified speed for flash photography. Accordingly, the initiation of operation of the shutter driving member 32 after setting the diaphragm aperture opens the shutter fully and, upon lapse of a specified time after the initiation of measuring by the count switch 40, the electromagnet 39 for the shutter is deenergized to close the shutter. At the moment when the shutter is fully opened, the flash will of course be fired by unillustrated means.

The distance associated member 18 may be shifted toward the short distance side for the adjustment of the subject distance, such that as indicated in the solid line in FIG. 1 the first diaphragm actuating member 5 will be located at a small aperture setting (for example f8) for an ordinary photographic operation, namely such that the second diaphragm actuating member 7 can no longer turn further counterclockwise, with its attraction piece 11 pressed against the attracting face of the electromagnet 12. In such case, the cam portion 18b will contact the pin 5c of the first diaphragm actuating member 5 in the solid-line position to push the pin 5c leftward, permitting the first diaphragm actuating member 5 to turn, along with the diaphragm sector opening and closing member 3, in a counterclockwise direction against the spring 8 as illustrated in the phantom lines, because the first and second diaphragm actuating members 5 and 7 are connected together with the spring 8. This makes it possible to set the diaphragm aperture at a smaller value for flash photography and to thereby prevent the possibility of an over-exposure in the case of a very short subject distance. Further in this case, the diaphragm aperture value has already been determined when the shutter is tripped. Although the electromagnet 12 remains unenergized, the exposure is made at the specified speed by the electronic shutter when the shutter is tripped, with the operative diaphragm means held stationary.

If the flash unit is removed from the camera, the detecting means 24 shifts upward, causing the spring 21 to turn the latch lever 23 in a clockwise direction. The arm 23a therefore pushes the bent rear end 18c of the distance associated member 18 and forces the member 18 rightward against the spring 19, bringing the member 18 out of the operative relation with the distance adjusting member 15. The member 18 is retained in position as determined by the stop 22.

As described above, the electromagnet 12 and the distance associated member 18 act as two diaphragm aperture size determining elements independent of each other to control the operation of the first and second diaphragm actuating members 5 and 7 and diaphragm sector opening and closing member 3 serving as the diaphragm setting and operating means. In the absence of the flash unit, the diaphragm aperture is set at two stages of large and small values based on the information given by the electromagnet 12, whereas if the flash unit is mounted on the camera, the diaphragm aperture is set steplessly in accordance with the subject distance based on the information afforded by the distance associated member 18. The specific construction of this invention is not limited to the foregoing embodiment, which can be modified as desired within the scope of this invention.

When the shutter is cocked after the completion of photographic operation, the shutter release actuating member 10 is moved rightward while tensioning the spring 42 in operative relation to an unillustrated cocking member or film transport means. The arm 10a comes into contact with the lower end 7c of the second diaphragm actuating member 7 to turn the member 7, first diaphragm actuating member 5 and diaphragm sector opening and closing member 3 counterclockwise. At the position where the member 10 completes its rightward travel, it brings the attraction piece 11 into pressing contact with, or into proximity to, the electromagnet 12 to set the diaphragm aperture for example at f8.

The rightward travel of the shutter release actuating member 10 frees the shutter opening initiating member 33 from the clockwise pressure by the rear end upright lug 10b of the member 10, so that the member 33 turns in a counterclockwise direction under the action of the spring 35 to follow the rightward travel. Further the upright lug 10b comes into contact with the bent portion 32d of the shutter driving member 32 located at the position where it has completed the shutter opening and closing action and turns the member 32 counterclockwise to tension the spring 30 thereon.

The counterclockwise movement of the shutter driving member 32 brings the pin 32c into contact with the driven arm 38a of the shutter closing initiating member 38, the end of the arm 38a being disposed in the path of counterclockwise movement of the pin 32c. Accordingly, the pin 32c turns the member 38 clockwise against the spring 37, consequently bringing the attraction portion 38b into pressing contact with, or into proximity to, the attracting face of the electromagnet 39 when the shutter release actuating member 10 reaches the extremity of its rightward travel. At the same time, the bent portion 32d closes the count switch 40. The stepped portion 33a of the shutter opening initiating member 33 comes into engagement with the pin 32b to latch the shutter driving member 32 in its cocked position. During the rightward travel of the shutter release actuating member 10, the arm 10a rides on the slanting edge of the upward projection of the shutter release member 43, turning the member 43 counterclockwise. When the member 10 reaches the extremity of its rightward travel, the arm 10a completes its riding action, whereupon the shutter release member 43 turns clockwise under the action of the spring 45, causing the upward projection 43a to project at the left of the arm 10a and to thereby latch the shutter release actuating member 10 at its cocked position.

During the cocking operation of the shutter driving member 32, the arm 32a might possibly contact the opening pin 27c on the shutter sector opening and closing member 27 and turn the member 27 clockwise again to expose the film again during transport. To avoid such objection, conventional means for preventing re-exposure may of course be provided or the shutter sector opening and closing member 27 may be prevented from turning by some other suitable means.

Figure 3:
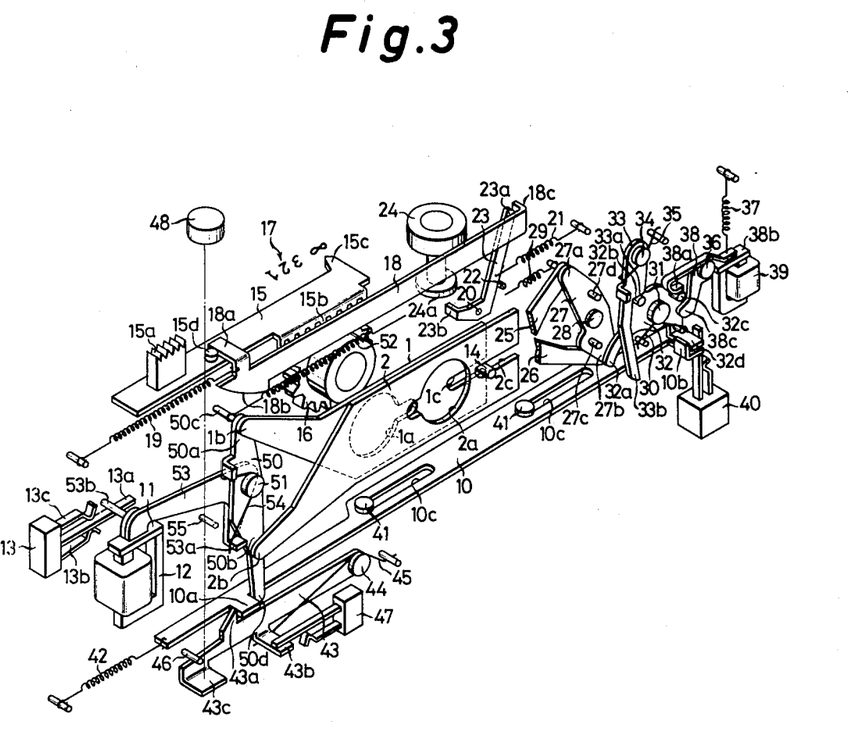
FIG. 3 is a perspective view showing the principal part of another embodiment of this invention.

FIG. 3 shows diaphragm setting and operating means greatly simplified in its construction as compared with the embodiment of FIGS. 1 and 2. The same parts as in FIGS. 1 and 2 are referred to by the same reference numerals and the operation of the same will not be described.

FIG. 3 shows a first diaphragm actuating member 50 serving both as the diaphragm sector opening and closing member 3 and the first diaphragm actuating member 5 in FIGS. 1 and 2. The arms 1b and 2b of the diaphragm sectors 1 and 2 are pivotally connected to the upper end 50a of the member 50 and another portion 50b which is symmetrical to the upper end 50a with respect to a pivot 51 for the member 50. The pivotal movement of the member 50 about the pivot 51 changes the overlapping of the diaphragm openings 1a and 2a to alter the diaphragm aperture size.

The first diaphragm actuating member 50 is urged by a spring 52 in a clockwise direction and is provided at its upper end 50a with a pin 50c adapted to contact the cam portion 18b of the distance associated member 18 to determine the diaphragm aperture size. Under the action of the spring 52, the lower end portion 50d of the member 50 is held in contact with the right side of arm 10a of the shutter release actuating member 10. Thus the member 50 is turnable in the clockwise direction to follow the leftward travel of the member 10 for a flash photography.

A second diaphragm actuating member 53 adapted to be retained, by the attraction piece 11, on the attracting face of the electromagnet 12 for the diaphragm when the electromagnet 12 is energized is pivoted to the same pivot 51 as the first diaphragm actuating member 50 and has its lower bent end 53a held in contact with the left side of the first diaphragm actuating member 50 by the action of a spring 54 connecting the first and second diaphragm actuating members 50 and 53, the member 53 thereby being rendered pivotally movable with the member 50, the construction being so designed that when the attraction piece 11 is held in intimate contact with the attracting face of the electromagnet 12, the diaphragm aperture is set, for example, at f8 as desired for photographing a bright subject. Further in the state described, distance adjustment is made, such that when the cam portion 18b of the distance associated member 18 pushes the pin 50c of the first diaphragm actuating member 50 leftward, the member 50 is permitted to move further counterclockwise to give a diaphragm aperture size smaller than f8. The second diaphragm actuating member 53 has a pin 53b for operating the change-over switch 13 to give diaphragm aperture information to the exposure amount control electric circuit in accordance with the energization and unenergization of the electromagnet 12. Indicated at 55 is a stop for holding the first and second diaphragm actuating members 50 and 53 at the position where the diaphragm is fully opened.

Depression of the shutter button 48 when the shutter is in its cocked position as seen in FIG. 3 frees the shutter release actuating member 10 from engagement with the shutter release member 43 into leftward travel. If the subject has a high brightness at this time, the electromagnet 12 energized upon closing of the main switch 47 by the depressed shutter button 48 electrically holds the second diaphragm actuating member 53 by the attraction piece 11, causing the spring 54 and the first diaphragm actuating member 50 to maintain the diaphragm aperture for example at f8 in corresponding relation to the high brightness. The spring 52 biasing the first diaphragm actuating member 50 in a clockwise direction is weaker than the connecting spring 54.

If the subject has a low brightness, the magnet 12 remains unenergized in spite of the closing of the main switch 47, so that when the release actuating member 10 travels leftward upon a shutter tripping action, the first diaphragm actuating member 50 turns, along with the second diaphragm actuating member 53, in a clockwise direction under the action of the spring 52, following the leftward travel. The diaphragm is therefore opened to full aperture.

If the unillustrated flash unit is mounted on the camera, the distance associated member 18 is released from its latched position and made operable with the distance adjusting member 15, with the result that the cam portion 18b for governing the amount of pivotal movement of the first diaphragm actuating member 50 is set at a position corresponding to the subject distance. Upon tripping the shutter, therefore, the first diaphragm actuating member 50 turns in a clockwise direction along with the second diaphragm actuating member 53 (with the electromagnet 12 unenergized) and is then prevented from movement by the contact of the pin 50c with the cam portions 18b. This gives a diaphragm aperture value in corresponding relation to the subject distance.

After the diaphragm aperture setting, the shutter is initiated into action when the shutter release actuating member 10 approaches the extremity of its leftward travel. The shutter is opened and closed in the same manner as already described.

After taking a photograph, the shutter is cocked in the same manner as the foregoing. According to FIGS. 1 and 2, the shutter release actuating member 10 operates the second diaphragm actuating member 7, whereas with FIG. 3, the release actuating member 10 operates the first diaphragm actuating member 50.

What is claimed is:

1. In a photographic camera on which a flash unit can be mounted including adjustable diaphragm sectors delineating a diaphragm aperture of adjustable value, an objective lens axially movable for focusing, a focus adjusting member manually operable for adjusting the axial position of said objective lens, and means including a light responsive electric circuit for producing an output signal in response to the camera incident light, an automatic diaphragm control mechanism comprising:

an electromagnet coupled to said electric circuit and energized in response to said output signal;

control means movable to a position dependent on a subject distance to be set in operative relationship with said focus adjusing member;

retaining means for retaining said control means so that said control means cannot move to the position in operative relationship with said focus adjusting member;

detecting means capable of detecting the presence of said flash unit on said camera for releasing said control means from said retaining means upon detection of the presence of said flash unit on said camera; and diaphragm setting means for adjusting said diaphragm aperture alternatively to two predetermined values in response to the energization and unenergization of said electromagnet in the absence of a flash unit on said camera and for setting the value of said diaphragm aperture in response to the position of said control means in the presence of a flash unit on said camera and in the unenergized condition of said electromagnet.

2. The automatic diaphragm control mechanism as set forth in claim 1 wherein said diaphragm setting means includes:

a first diaphragm actuating member capable of being cocked by said electromagnet when said electromagnet is energized and operable when said electromagnet is unenergized; and a second diaphragm actuating member coupled and operable with said first diaphragm actuating member and connected to said diaphragm sectors, said second diaphragm actuating member being capable of alternatively setting the diaphragm aperture to said two predetermined values in response to the cocking and operation of said first diaphragm actuating member when said flash unit is not mounted on said camera, and being engageable with said control means during its operation to set the diaphragm aperture value in accordance with the position of said control means when said flash unit is mounted on said camera and said electromagnet is unenergized.

3. The automatic diaphragm control mechanism as set forth in claim 2 wherein said electromagnet is energized when the brightness of a subject is higher than a predetermined level and remains unenergized when the brightness is lower than the predetermined level.

4. The automatic diaphragm control mechanism as set forth in claim 3 wherein said first and second diaphragm actuating members are coupled with each other by spring means, and when said focus adjusting member is operated so that a very short subject distance can be set and said flash unit mounted on said camera, said control means is further movable in operative relationship with said focus adjusting member and capable of pushing said second diaphragm actuating member with said first diaphragm actuating member remaining in said cocked position against the biasing force of said spring means so that said second diaphragm actuating member can set the diaphragm aperture to a value smaller than that which is set when the brightness of said subject is higher than the predetermined level and said flash unit is not mounted on said camera.

5. The automatic diaphragm control mechanism as set forth in claim 2 wherein said diaphragm setting means further includes a diaphragm sector opening and closing member operatively associated with said second diaphragm actuating member to operate said diaphragm sectors.

6. The automatic diaphragm control mechanism as set forth in claim 2 wherein said second diaphragm actuating member is directly connected to said diaphragm sectors so as to vary the diaphragm aperture size by the operation thereof.

7. In a photographic camera on which a flash unit can be mounted and which includes adjustable diaphragm blades delineating a diaphragm aperture of adjustable value, an objective lens, a focus adjusting member manually operable for adjusting said objective lens to the subject distance for focusing, and means including a light responsive electric circuit for producing an output signal in response to the camera incident light, an automatic diaphragm control mechanism comprising:

means movable for setting said diaphragm blades in accordance with the position thereof;

control means movable in operative relationship with said focus adjusting member for positioning said setting means at a position dependent on the subject distance to be set;

means for releasably disabling said control means;

means for releasing said disabling means when said flash unit is mounted on said camera; and an electromagnet coupled to said electric circuit so as to be energized in response to the output signal, said electromagnet being capable of alternatively positioning said setting means at a first and second position in accordance with unenergization and energization thereof when said disabling means disables said control means, and said setting means setting said diaphragm blades to an aperture fully open when in said first position and to an aperture closed down to a predetermined size when in said second position.

* * * * *